Nov. 24, 1953
G. W. MERRITT
2,660,293
CONVEYER APPARATUS
Filed May 21, 1951
3 Sheets-Sheet 1
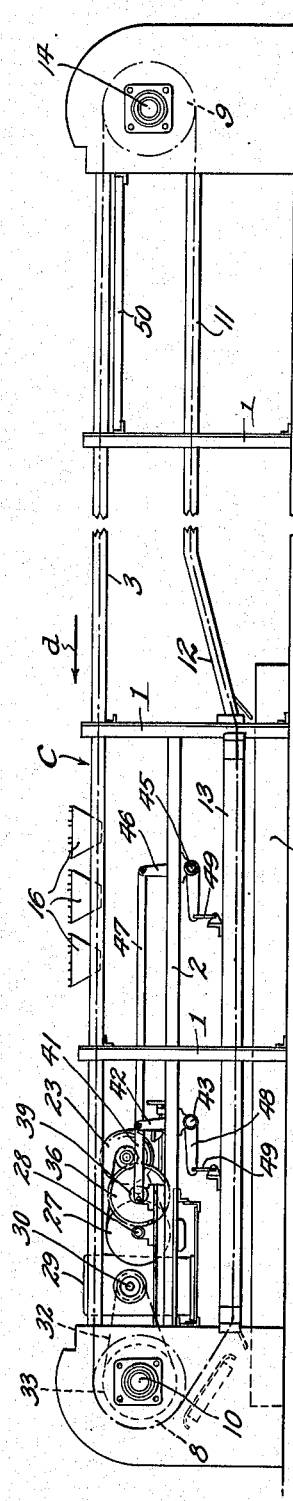
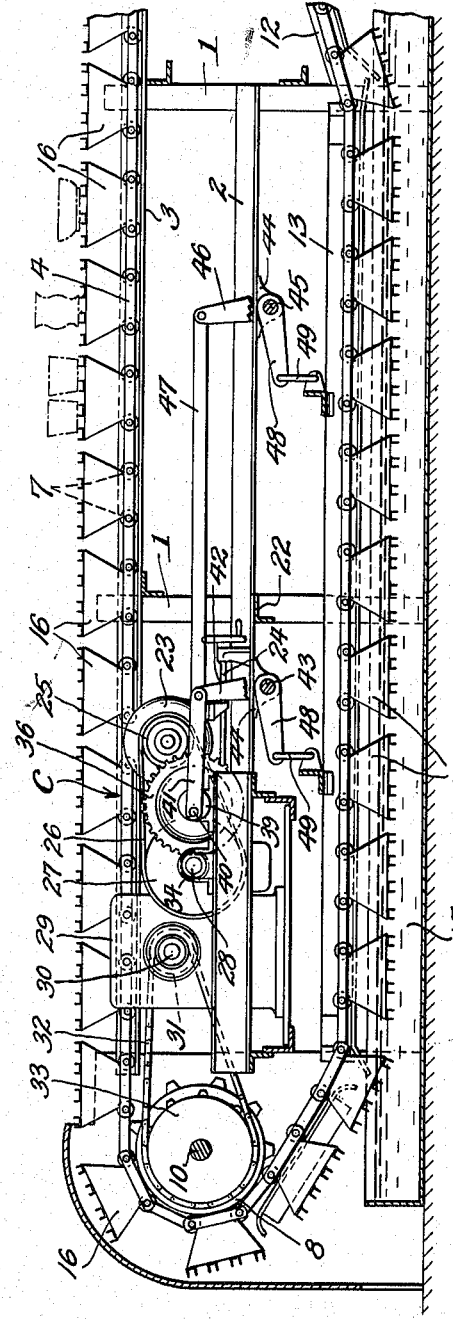
INVENTOR
*Glenn W. Merritt*
BY *W. S. McDowell*
ATTORNEY Nov. 24, 1953  G. W. MERRITT  2,660,293
CONVEYER APPARATUS
Filed May 21, 1951  3 Sheets-Sheet 2
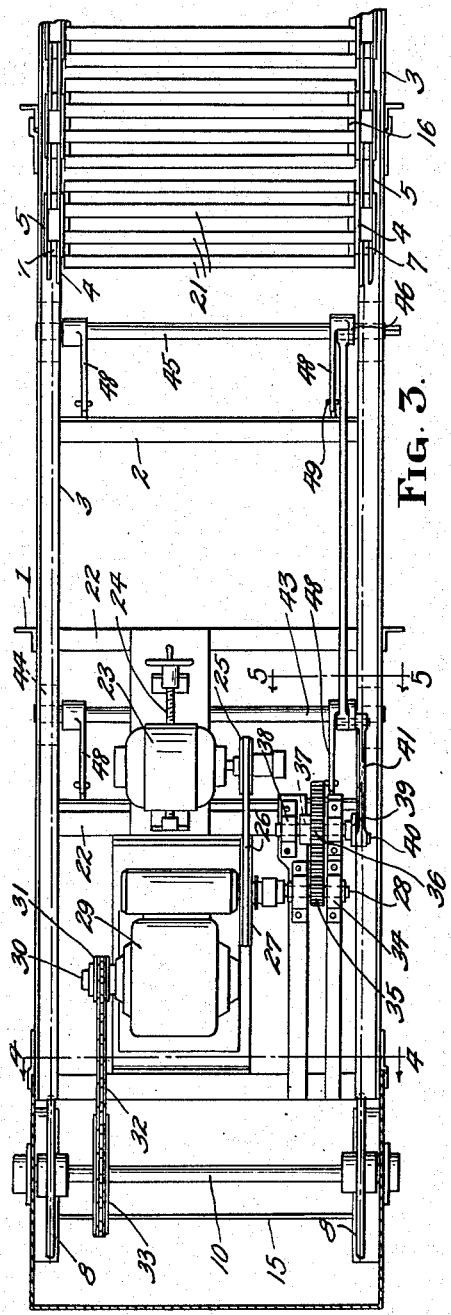
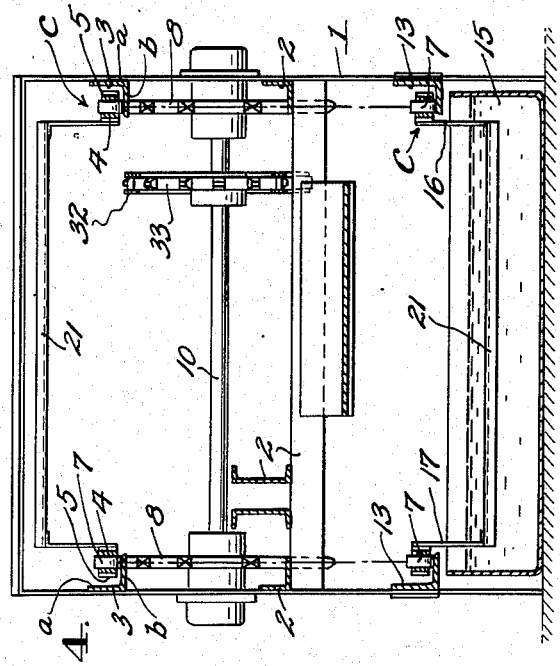
INVENTOR
*Glenn W. Merritt*
BY *W. S. McDowell*
ATTORNEY Nov. 24, 1953 G. W. MERRITT 2,660,293
CONVEYER APPARATUS
Filed May 21, 1951 3 Sheets-Sheet 3
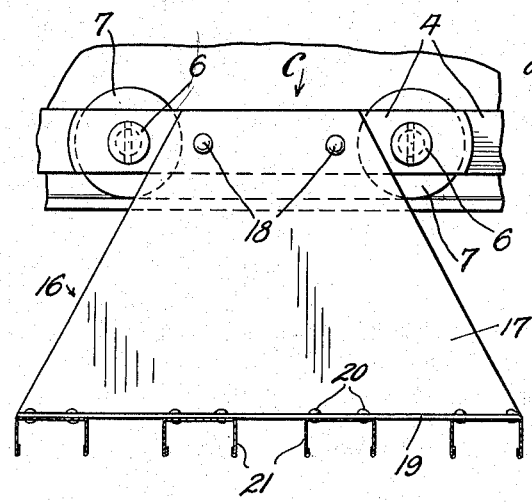
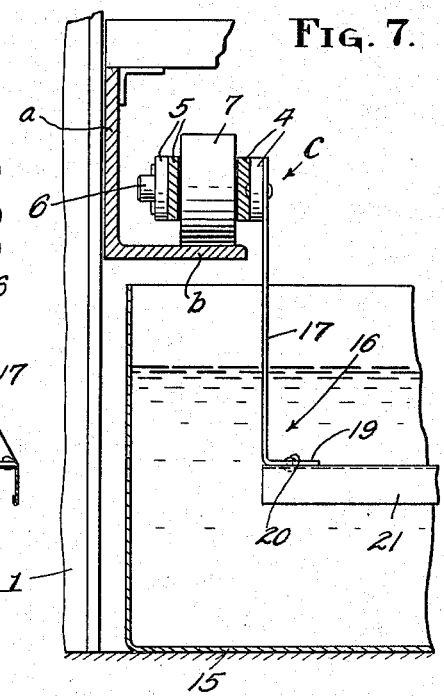
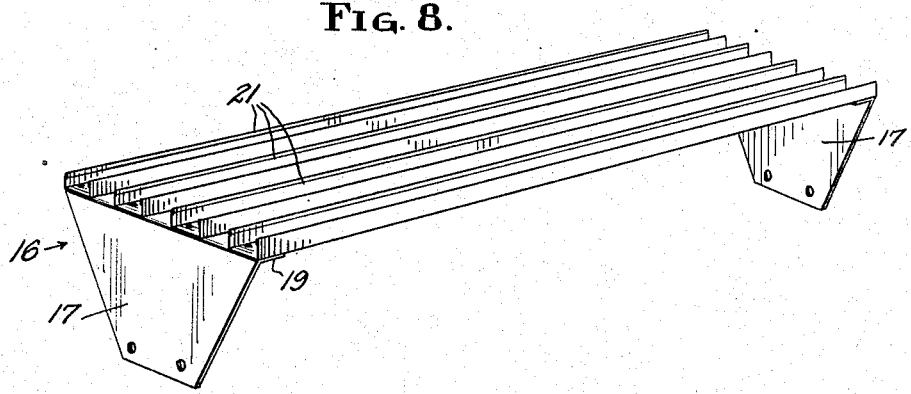
INVENTOR
Glenn W. Merritt
BY *M. S. McDowell*
ATTORNEY Patented Nov. 24, 1953

2,660,293

UNITED STATES PATENT OFFICE 2,660,293

CONVEYER APPARATUS

Glenn W. Merritt, Bowerston, Ohio, assignor to The Nolan Company, Bowerston, Ohio, a corporation of Ohio Application May 21, 1951, Serial No. 227,339

4 Claims. (Cl. 198—229)

This invention relates to conveyor apparatus, having particular reference to conveyor apparatus used in facilitating and expediting various manufacturing operations and wherein use is made of endless conveyor belts having portions thereof movable into and out of receptacle-held liquids.

In one of its more specific aspects, the present invention is concerned with the construction of dipping conveyors of the type used in the manufacture of pottery or earthenware products. In the manufacture of glazed earthenware, the initially formed ware has applied thereto a fluid glaze. Thereafter the glaze-coated ware is deposited on a moving conveyor belt and subjected to a drying operation. Often these conveyor belts are of woven wire construction and, in operation, the same become coated with deposits of the freshly applied glaze on the coated articles. It is necessary to clean such belts after every working shift, although, in some cases, it is dragged through a water bath which assists in keeping the belt clean to some degree, or, again, the belt is passed through or in contact with high pressure spray nozzles, by which a cleansing fluid under pressure is utilized to remove glaze deposits.

It is an object of the present invention to provide a dipping conveyor wherein the use of woven wire belts is avoided and in lieu thereof track-mounted roller chains are used, the roller chains being united by transversely extending ware-supporting trays, and wherein provision is made for passing the trays, following removal of glazed ware therefrom, through a body of cleansing liquid contained in an associated tank, whereby to maintain the trays in a cleanly condition at all times for the reception of freshly glazed ware and to make possible the application of a wide variety of colors to the ware without contamination of the trays.

Another object of the invention is to provide continuously operating conveyor apparatus for automatically and expeditiously performing the operation of dipping product-supporting trays in fluidic washing materials while such trays are moving along a confined longitudinal path of travel.

Another object of the invention is to provide apparatus of this character utilizing endless rollered chains mounted for movement along frame-supported guides and driven by motor-actuated sprockets, and wherein the chains carry transversely extending and longitudinally spaced trays or benches which in the course of movement of the chains are passed through a body of fluidic washing material, contained in an associated tank, while the chains and trays carried thereby are undergoing sustained longitudinal advance.

A further object of the invention is to provide an apparatus of the aforementioned type in which the trays, while passing through a body of fluidic material, are subjected to vertical motion during sustained longitudinal advance thereof in unison with their associated track-chains, whereby to obtain improved washing contact between the fluidic material and the trays.

A still further object of the invention is to provide apparatus of this character in which a single motor is employed for driving the conveyor belt and simultaneously imparting localized vertical or perpendicular movement to the product-carrying trays.

Again a further object of the invention is to provide a dipping conveyor which is generally of new and improved construction, operates efficiently and may be built at a comparatively low and reasonable cost.

Other objects of the invention and the various advantages and characteristics of the present construction will be apparent from a consideration of the following detailed description.

The invention consists in the several novel features which are hereinafter set forth and are more particularly defined by the claims at the conclusion hereof.

In the drawings which accompany and form a part of this specification or disclosure and in which like numerals of reference denote corresponding parts throughout the several views:

Fig. 1 is a side view of a dipping conveyor embodying the present invention;

Fig. 2 is a vertical longitudinal sectional view taken through the driving end of the conveyor and disclosing the mechanism for locally raising and lowering the conveyor during its sustained longitudinal advance;

Fig. 3 is a fragmentary top plan view, partly broken away, disclosing the drive mechanism for the conveyor and its associated raising and lowering linkage;

Fig. 4 is a vertical transverse sectional view taken on the plane indicated by the line 4—4 of Fig. 3;

Fig. 5 is a fragmentary detail vertical transverse sectional view on the line 5—5 of Fig. 3;

Fig. 6 is a detail vertical longitudinal sectional view taken through one of the product-supporting trays of the present invention and disclosing the mounting of the tray in association with a roller-equipped chain;

Fig. 7 is a vertical transverse sectional view, showing fragmentarily a portion of the roller chain and the product-carrying tray carried thereby, and the relation of the tray to an associated fluid-receiving tank;

Fig. 8 is a detail perspective view disclosing one of the product-receiving trays or benches detached from its associated conveyor chains.

The apparatus which forms the subject matter of this invention is adapted to be used in connection with the washing of trays or other article supports used in the manufacture of glazed ceramic articles. While this is one of its preferred uses, it will be understood as the description proceeds that the conveyor is applicable to effect immersion of various devices, wares or workpieces while traveling in unison with an associated conveyor belt in a fluidic bath adapted for washing, coating or otherwise treating the immersed or partially immersed devices.

In the form of the apparatus illustrated, I employ a frame structure comprising interconnected upright members 1 and horizontally disposed longitudinally extending members 2. In this instance, the frame structure further includes fixed conveyor guides 3, the latter consisting preferably of rolled steel angle members having vertical webs a and horizontal webs b, the guides 3 serving to effect the support of the horizontal upper run or reach of an endless conveyor belt assembly C.

As shown more particularly in Fig. 6, the belt comprises a pair of longitudinally extending transversely spaced chains composed of inner and outer sets of links 4 and 5, respectively. These links are arranged in pairs. Each pair carries at its ends pins or axles 6 which effect the rotatable support of rollers 7 which engage with the horizontal web b of the guides 3, the pins or axles also serving to articulately unite contiguous ends of adjoining belt links.

These links or chains form endless belts, which are trained over drive sprockets 8 and idler sprockets 9, the sprockets 8 and 9 being located at opposite ends of the frame structure of the machine, as indicated in Fig. 1. The drive sprockets 8 are fixed in spaced order on a drive shaft 10 arranged at the foot end of the machine, the shaft end being driven in a direction to cause advancement of the conveyor belt C in a manner indicated by the arrows d of Fig. 1. The lower run or reaches of the chain belt C travel along fixed guides 11 which correspond to the upper guides 3. In this instance, however, the guides 11 are shorter in length than the upper guides and terminate intermediately of the length of the framework in stationary downwardly inclined portions 12. The ends of these downwardly inclined portions are adapted to register with vertically movable reciprocatory guide tracks 13, which are adapted to support the lower runs or reaches of the chain belts after the latter pass around the drive sprockets 8 on their return movement toward the head shaft 14 on which the sprockets 9 are mounted. As hereinafter described, mechanism is provided for imparting reciprocatory raising and lowering movement to the guide tracks 13, the latter being disposed over an open-topped fluid-containing tank 15, which rests on the floor or other base surface of the machine and extends from the foot end thereof to a position beyond the inclined portions 12 of the guides 11.

In this instance, the conveyor chains are provided with product-supporting trays or benches 16 which move in unison with said chains. As shown in Figs. 2, 6 and 7, each of these trays or benches comprises triangular end plates 17, which are bolted or otherwise fastened as at 18 to alternate inner links 4 of the conveyor belts C. The wider ends or edges of the plates 17 are flanged as at 19 and have riveted or otherwise secured thereto, as at 20, the ends of a plurality of longitudinally extending, parallel and relatively spaced channel members 21. The trays thus unite the roller chains transversely, forming a composite conveyor belt of the endless type on which various kinds of products may be positioned and secured for movement in unison with the belt, enabling a wide variety of operations to be performed on such products or their carriers, as by washing the same with water contained in the tank 15, in applying glazes and engobes to molded ceramic ware, the washing of molds in which ceramic products are cast, and in many other capacities.

To drive the conveyor C, there is mounted on cross members 22 forming a part of the framework of the machine, an electric motor 23, the operating positions of which are subject to longitudinal adjustment through the control screw indicated at 24. The armature shaft of this motor drives a pulley 25 around which passes a drive belt 26, the latter being also trained over a belt wheel 27 which is fixed to the power-input shaft 28 of a speed-reducing mechanism 29. This mechanism includes a driven shaft 30 which carries a sprocket 31 having passed thereabout a chain 32, the latter leading to a sprocket 33 fixed to the drive shaft 10. By this arrangement, speeds of the order of three to nine linear feet per minute may be imparted to the conveyor belt, although this, of course, is subject to change depending upon the particular functions to which the conveyor mechanism is placed in use.

The power-input shaft 28 of the speed-reducing mechanism 29 is extended and arranged for rotation in outer bearings 34, mounted on the frame structure of the machine. Between these outer bearings, the shaft 28 carries a spur tooth pinion 35, which meshes with the teeth of a spur gear 36 which is fixed to rotate with a short shaft section 37, the latter being rotatable in bearings 38 carried by the frame structure. The outer end of the shaft section 37 carries a disk 39, to the outer face of which is fixed an eccentric wrist pin 40. Swiveled on this pin is one end of a link 41, the opposite end of said link being pivoted to the other end of a crank arm 42, the hub of the latter being fixed on a rock shaft 43 which is journaled transversely in the framework of the machine in connection with bearings shown at 44. Also, there is provided toward the head end of the machine a second parallel rock shaft 45, which is joined with the rock shaft 43 for movement in unison therewith by means of crank arms 46 and connecting links 47. The rock shafts 43 and 45 carry crank arms 48 which are linked as at 49 with the vertically movable guide tracks 13.

By this arrangement, it will be seen that when the motor 23 is in operation driving the conveyor belt C, motion will be imparted simultaneously to the disk 39 so that the eccentric wrist pin 40 through associated link and crank arm connections will oscillate the rock shafts 43 and 45, thereby imparting raising and lowering movement to the localized length of the conveyor C suspended from the movable guide tracks 13. Therefore, the trays undergoing immersion in the water or other liquid materials contained in the tank 15 are not only moved longitudinally through said liquid materials by the expected action of the conveyor belt, but are also subjected to reciprocatory vertical movement, which is perpendicular to the general plane of movement of the immersed articles. By this arrangement, thorough washing or coating of the trays or other devices takes place.

A specific use for the dipping conveyor forming the present invention is that of drying glaze applied on pottery ware and in cleaning the trays or carriers used in the support of such glazed ware during drying thereof and which have become contaminated with the glaze. In the use of the conveyor, the ware is first hand or otherwise dipped at the head end of the conveyor and is placed on the advancing upper run of the conveyor by being deposited on and held by the bars 21 thereof. The ware is retained on the advancing upper run of the conveyor until drying of the glaze has been effected, the length of the conveyor and its linear speed of advance being regulated to insure such drying. As the upper run of the conveyor reaches the foot end of the machine, the glazed and dried articles are removed from the trays. Thereafter, the trays turn about the sprockets 8 and are immersed in the washing fluid contained in the tank 15, wherein the removal of adhering glaze and other deposits is effected. By the time the lower run of the conveyor belt reaches the head end of the machine, the same will be in a cleanly condition suitable for the reception of the freshly glazed ware. A drip pan may be provided at 50 beneath the upper run of the conveyor belt, adjacent to the head end of the machine to receive glaze drippings.

The herein described apparatus is exceedingly efficient in operation and permits of continuous washing of the belt-supported trays or carriers automatically, maintaining the conveyor at all times in condition for sustained low-cost operation.

The invention is not to be understood as restricted to the details set forth, since these may be modified within the scope of the appended claims, without departing from the spirit and scope of the invention.

I claim:

1. In conveyor apparatus, the combination of a supporting structure, fixed upper and lower conveyor guides disposed horizontally and longitudinally of said structure, endless conveyor means supported for movement on the guides of said structure, foot and head shafts rotatably supported in the opposite ends of said structure, motor-driven means for rotating said foot shaft to impart movement to said conveyor means, a liquid-holding tank arranged beneath a part of the length of said conveyor means, vertically movable longitudinally extending guide devices for the support of the portion of said conveyor means in registry with said tank, and motor-driven means for imparting limited vertical reciprocatory movement to the movable guide devices of said conveyor means.

2. In conveyor apparatus, the combination of a supporting frame, upper and lower horizontally extending conveyor guides carried by said frame, head and foot shafts journaled transversely for rotation in the ends of said frame, sprockets carried by said shafts, endless roller-equipped chains movable along said guides in parallel transversely spaced relation and passing around the sprockets of said head and foot shafts, a drive motor, speed-reducing mechanism driven by said motor for imparting rotation to said foot shaft and the conveyor chains associated therewith, a liquid-holding tank, movable chain guides carried by said frame in vertical registry with said tank, and means driven by said motor for imparting vertical reciprocatory movement to said movable chain guides during longitudinal travel of the conveyor chains thereover.

3. Conveyor apparatus for the decoration of ceramic articles comprising: an elongated frame structure; upper and lower sets of longitudinally extending stationary guides carried by the opposite sides of said frame structure; head and foot shafts journaled transversely in the ends of said frame structure; sprockets mounted on said shafts; endless rollered chains passing around said sprockets and along the guides of said frame structure, said chains forming endless conveyor belts having upper and lower runs; transversely extending, longitudinally spaced, parallel, product-supporting trays carried by said chains; vertically movable guides carried by the lower part of said frame structure and cooperative with said first-named guides for the regulated travel of said chains during travel thereof along the lower runs thereof; a stationary liquid-holding tank arranged beneath the movable chain guide; a motor for driving said foot shaft; oscillatory crank members mounted on said frame structure; means actuated by the foot shaft driving means for oscillating said crank members; and link means uniting said crank members with said vertically movable guides for imparting vertically directed undulatory movement thereto.

4. In conveyor apparatus, the combination of a supporting structure; fixed upper and lower conveyor guides disposed horizontally and longitudinally of said structure; endless conveyor means supported for movement on the guides of said structure; foot and head shafts rotatably mounted in the opposite ends of said structure transversely thereof; a drive motor on said supporting structure; motion-transmitting mechanism including a speed-reducing means for imparting controlled movement to the foot shaft from said motor, whereby to drive said conveyor means; a liquid-holding tank arranged beneath a part of the length of the lower run of said conveyor means; vertically movable longitudinally extending guide devices cooperative with said first-named guides for the movable support of said conveyor means in registry with said tank; a plurality of oscillatory crank members pivotally mounted on said frame structure contiguous to said vertically movable guide devices; motion-transmitting means driven by said motor for imparting oscillatory movement to said crank members; and means linking said crank members with said movable guide devices by which the latter are moved vertically in an undulatory manner by power derived from said motor during uninterrupted longitudinal movement of the conveyor means while traveling along the lower and movable conveyor guides.

GLENN W. MERRITT.

References Cited in the file of this patent
UNITED STATES PATENTS

| Number | Name | Date |
|---|---|---|
| 729,512 | Sejnoha | May 26, 1903 |
| 1,090,845 | Goss | Mar. 24, 1914 |
| 2,547,462 | Hapman | Apr. 3, 1951 |